United States Patent
Allan et al.

(10) Patent No.: US 8,224,946 B2
(45) Date of Patent: Jul. 17, 2012

(54) METHOD AND APPARATUS FOR ACCOMMODATING DUPLICATE MAC ADDRESSES

(75) Inventors: David Allan, Ottawa (CA); Nigel Bragg, Weston Colville (GB)

(73) Assignee: Rockstar Bidco, LP, New York, NY (US)

( * ) Notice: Subject to any disclaimer, the term of this patent is extended or adjusted under 35 U.S.C. 154(b) by 257 days.

(21) Appl. No.: 12/429,210

(22) Filed: Apr. 24, 2009

(65) Prior Publication Data

US 2010/0274924 A1    Oct. 28, 2010

(51) Int. Cl.
*G06F 15/173* (2006.01)
(52) U.S. Cl. .......................... 709/223; 709/245
(58) Field of Classification Search .................. 709/223; 370/401
See application file for complete search history.

(56) References Cited

U.S. PATENT DOCUMENTS

| | | | |
|---|---|---|---|
| 2004/0030769 A1 | 2/2004 | Lim et al. | |
| 2004/0078469 A1* | 4/2004 | Ishwar et al. | 709/227 |
| 2005/0018677 A1 | 1/2005 | Lee et al. | |
| 2005/0188241 A1* | 8/2005 | Cabezas et al. | 714/4 |
| 2005/0254489 A1* | 11/2005 | Jain et al. | 370/389 |
| 2006/0120317 A1* | 6/2006 | Zheng | 370/389 |
| 2006/0161661 A1* | 7/2006 | Johnson et al. | 709/226 |
| 2007/0118616 A1* | 5/2007 | Simongini et al. | 709/219 |
| 2007/0147261 A1* | 6/2007 | Schumacher et al. | 370/248 |
| 2007/0268919 A1 | 11/2007 | Sarikaya et al. | |
| 2008/0005329 A1* | 1/2008 | Bauman et al. | 709/226 |
| 2008/0080535 A1* | 4/2008 | Li et al. | 370/401 |
| 2008/0198809 A1* | 8/2008 | Kim | 370/331 |
| 2009/0006585 A1* | 1/2009 | Chen | 709/220 |
| 2010/0195620 A1* | 8/2010 | Cheng et al. | 370/331 |

FOREIGN PATENT DOCUMENTS

WO    WO 0101724    1/2001

OTHER PUBLICATIONS

Written Opinion of the International Searching Authority from corresponding PCT application PCT/CA2010/000610.

* cited by examiner

*Primary Examiner* — Christopher Biagini
(74) *Attorney, Agent, or Firm* — Withrow & Terranova, PLLC

(57) ABSTRACT

Each access node is associated with one or more IP subnets with a preferred default subnet. Each subnet is instantiated as a unique virtual Ethernet broadcast domain. As client nodes register on the communication network, they will dynamically try to obtain an IP address for use on the communication network. As part of this process, the MAC address of the client node will be checked to ensure that it is not a duplicate of another MAC address associated with another client node that has already been assigned an IP address from the default subnet. When duplicate MAC addresses are detected, the device with the duplicate MAC address will be assigned an IP address from a different subnet so that more than one client device with the same MAC address are not associated with the same subnet. In one embodiment, a DHCP server may implement the process of checking for duplicate MAC addresses. In an Ethernet context, different IP subnet prefixes may be mapped to different S-VID values so that the different subnets are implemented as different VLANs within the Ethernet network.

19 Claims, 4 Drawing Sheets

METHOD AND APPARATUS FOR ACCOMMODATING DUPLICATE MAC ADDRESSES

TECHNICAL FIELD

The present invention relates to communication networks, and, more particularly, to a method and apparatus for accommodating duplicate MAC addresses on a communication network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

Ethernet is a well known networking protocol that has been defined by the Institute of Electrical and Electronics Engineers (IEEE) as standards 802.1 and 802.3. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

FIG. 6 shows several fields that have been added to the Ethernet standard over time. As shown in FIG. 6, the original Ethernet frame format specified by IEEE 802.1 includes a source address (C-SA) and a destination address (C-DA). IEEE 802.1Q added a Customer VLAN tag (C-Tag) which includes an Ethertype, Tag Control Information (TCI) information, and customer VLAN ID (C-VID). IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of the customer MAC addresses (C-SA and C-DA) and the I-SID are commonly referred to as the I-Tag.

The Ethernet Media Access Control (MAC) address forms part of the Ethernet header. In a given broadcast domain such as an Ethernet LAN, each MAC address is required to be unique and identifies a particular networking entity so that frames can be unambiguously forwarded to that particular entity.

The MAC addressing scheme is designed to enable the MAC addresses to be globally unique. Specifically, the IEEE specifies a numbering scheme in which universally administered addresses are assigned to particular devices by the manufacturer when the devices are created. In the IEEE numbering scheme, the first two bits are set aside for local/multicast frame indication, and the remainder of the first three octets of the MAC address are referred to as the Organizationally Unique Identifier (OUI), and identify the manufacturer. An OUI code-point is assigned by the IEEE to a manufacturer as needed. The last three bytes are assigned by the manufacturer to the devices as they are created and burned into the devices so that each device created by that manufacturer will have a unique MAC address.

In general, manufacturers have adhered to this numbering scheme to create devices that have globally unique permanent MAC addresses. However, unfortunately, not every manufacturer has adhered to this convention. Thus, devices with duplicate MAC addresses are starting to appear. This is problematic for normal bridging, which "learns" the forwarding path to a given MAC address by bridges that receive a frame each observing and storing the port of arrival for traffic from that MAC address, and hence if multiple identical addresses appear in a bridged domain, the frame forwarding for a given MAC address will always go to the most recent source of a frame with that MAC address as source.

Typically, duplicate MAC addresses is more a problem with low cost consumer appliances than it is with very expensive network routers, etc., that are deployed within a service provider's network. When such low cost appliances are networked via a broadband access network that preserves the Ethernet frame content, duplicate addresses can become a problem and interfere with the correct operation of the network. Accordingly, one way that has been proposed to handle the possibility of duplicate MAC addresses appearing on a broadcast domain is to perform MAC Network Address Translation (NAT) in the access node where the customer devices connect to the service provider's network. This process enables any duplicate MAC address to be translated to a carrier administered globally unique value so that duplicate addresses do not appear within the service provider's network.

Unfortunately, MAC NAT is not trivial. Particularly in IPv6, where the MAC address becomes part of the IP address, performing MAC NAT is complex. Additionally, keeping the MAC NAT functionality in the access node up to date, which includes the awareness of new protocols, may require significant maintenance and ongoing software development. Accordingly, it would be desirable to provide another way to accommodate duplicate MAC addresses in a communication network.

SUMMARY

Each access node is associated with one or more IP subnets with a preferred default subnet. Each subnet is instantiated as a unique virtual Ethernet broadcast domain. As client nodes register on the communication network, they will dynamically try to obtain an IP address for use on the communication network. As part of this process, the MAC address of the client node will be checked to ensure that it is not a duplicate of another MAC address associated with another client node that has already been assigned an IP address from the default subnet. When duplicate MAC addresses are detected, the device with the duplicate MAC address will be assigned an IP address from a different subnet so that more than one client device with the same MAC address are not associated with the same subnet. In one embodiment, a DHCP server may implement the process of checking for duplicate MAC addresses. In an Ethernet context, different IP subnet prefixes may be mapped to different S-VID values so that the different subnets are implemented as different VLANs within the Ethernet network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

MAC addresses are required to be unique within a subnet so that traffic transmitted within the subnet can unambiguously be transmitted to particular nodes. In one embodiment, as client nodes connect to the communication network, they will register to obtain an IP address for use on the communication network. As part of this process, the MAC address of the client node will be checked to ensure that it is not a duplicate of another MAC address associated with another client node that has already been assigned an IP address for a particular subnet. When duplicate MAC addresses are detected, the device with the duplicate MAC address will be assigned an IP address from a different subnet so that more than one client device with the same MAC address is not associated with the same subnet. In one embodiment, a centralized address server (typically a DHCP server) may implement the process of checking for duplicate MAC addresses. In an Ethernet context, different IP subnet prefixes may be mapped to different S-VID values (IEEE 802.1ad) or I-SID values (IEEE 802.1ah) so that the different subnets are implemented as different VLANs within the Ethernet network.

Although an embodiment of the invention will be described with reference to an example where the duplicate MAC addresses appear on client nodes, the invention is not limited in this manner as duplicate MAC addresses may appear at other locations on the network. Thus, the techniques described herein may be extended to apply in other regions of the network as well.

Figure 1:
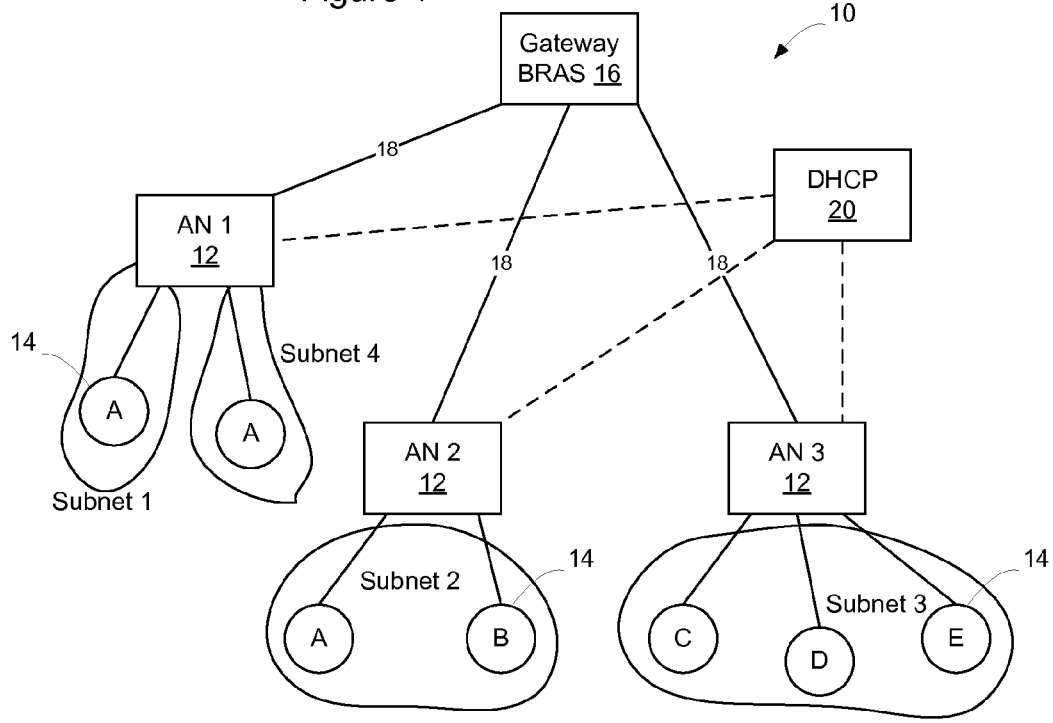
FIGS. 1-4 are functional block diagrams of a communication network showing the dynamic assignment of devices with duplicate MAC addresses to different subnets according to an embodiment of the invention.

FIG. 1 shows an example communication network 10, including access nodes 12, client nodes 14, and a gateway Broadband Remote Access Server (BRAS), also known in the industry as a Broadband Network Gateway (BNG), 16. The network 10 may include intermediate nodes interconnecting the access nodes 12 and the BRAS 16. For simplicity, the particular manner in which the devices are physically connected is not shown and rather only logical connections 18 between these devices have been shown.

In an access network it is common for an access provider to scale the solution by having multiple customers share a common S-VID and subnet prefix and employing bridging techniques for multiplexing/demultiplexing traffic between customers and the BRAS. This minimizes S-VID consumption and IP address fragmentation respectively. There is also a requirement that customers do not have layer 2 reachability of each other within the scope of an S-VID such that the BNG can be the primarily policy agent for connectivity. This requires access nodes and, potentially aggregation nodes to implement split horizon forwarding.

Although it is possible for "well behaved" clients to observe that they are not unique when they can see neighbor traffic, and possibly take corrective action, we need to consider that clients cannot see each other, and we need to assume the presence of potentially malicious clients. Hence a solution that does not require the cooperation of any network attached customer equipment is required.

If the network interconnecting the access nodes and the BRAS is an Ethernet network, traffic on the Ethernet network may be separated into separate VLANs by using different S-VIDs (for an Ethernet network implemented using 802.1ad) or different I-SIDs (for an Ethernet network implemented using 802.1ah). This means that the layer 3 subnets are virtualized at the Ethernet layer. Common practice is to tie this virtualization to specific facilities (e.g. an S-VID per individual access node) but this is not a requirement. The result is Hub-and-Spoke connectivity between the BRAS and the access nodes.

Each of the subnets will form a particular broadcast domain. Accordingly, it is important that each of the client devices 14 within a given subnet has a unique MAC address. In the example shown in FIG. 1, the client devices that are connected to access node 2 and access node 3 meet this criteria, and hence all of the client nodes connected to access node 2 may be assigned to subnet 2, and similarly all of the client connected to access node 3 may be included in subnet 3.

However, access node 1 has two client nodes that have the same MAC address. Specifically, in the example shown in FIG. 1, both client nodes that connect to access node 1 have the same MAC address=A. Rather than perform MAC NAT on one of the client nodes or simply deny service, according to an embodiment of the invention one of the nodes is assigned to a different subnet (subnet 4). This enables each subnet to have a discrete set of unique MAC addresses. By assigning the client node with a duplicate MAC address to a separate subnet, each subnet will have at most one instance of a particular MAC address. By using a different VLANs for each subnet, the traffic at the Ethernet layer may be unambiguously forwarded so that the duplicate MAC addresses are not problematic within the communication network.

Figure 2:
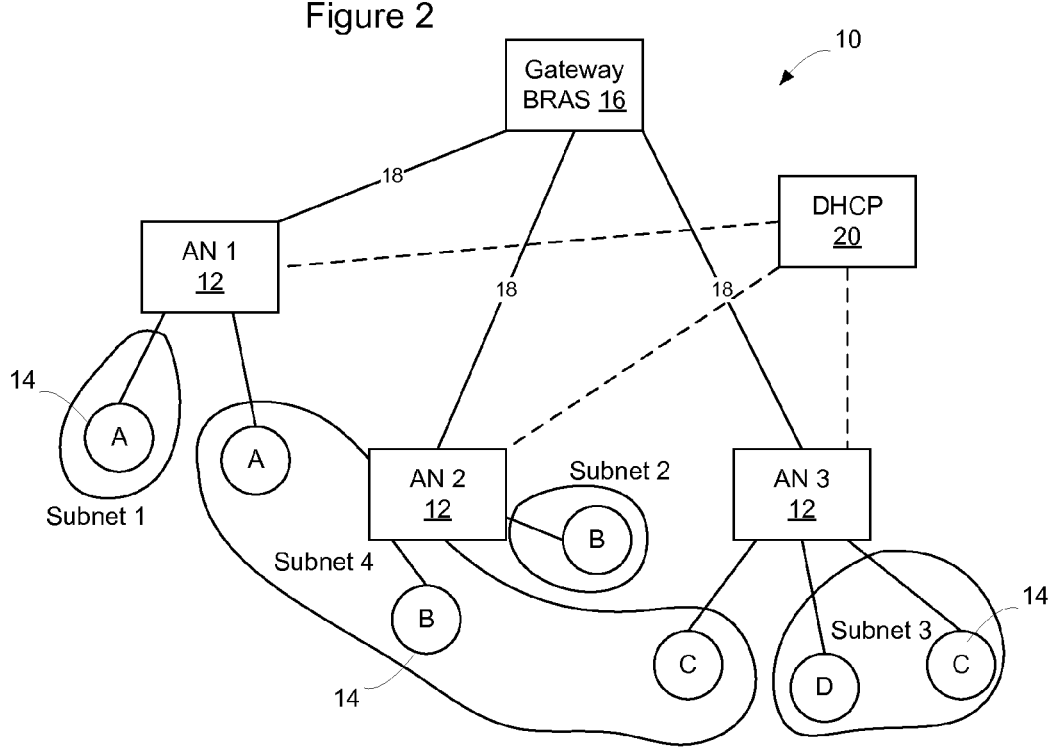
Figure 3:
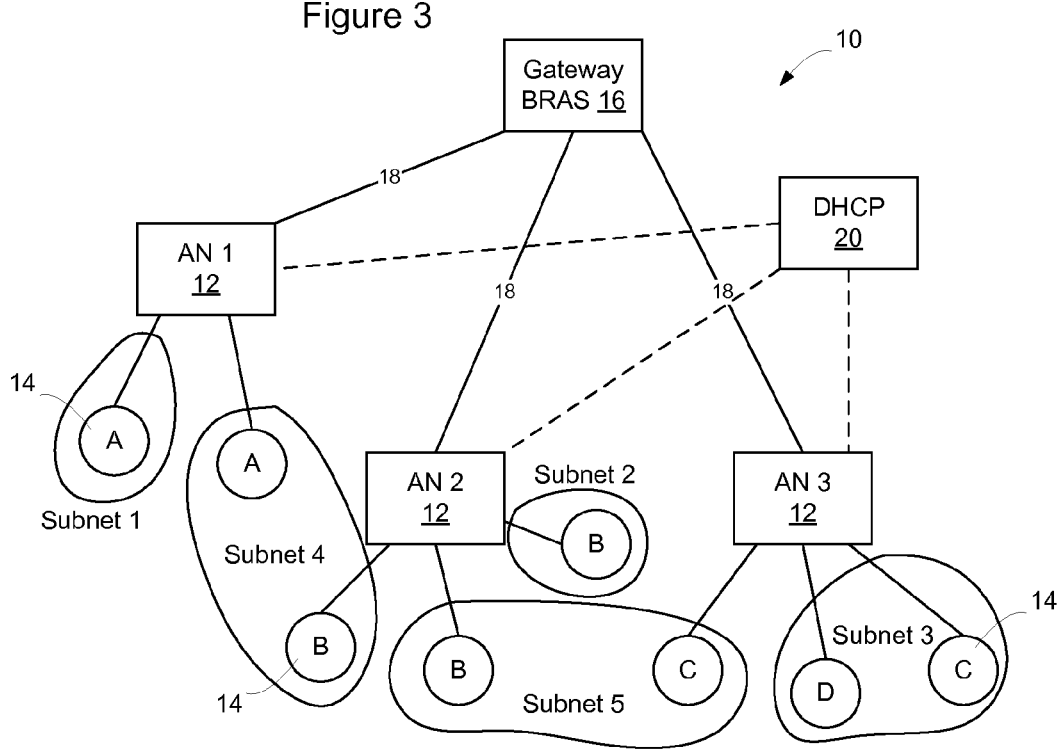
Figure 4:
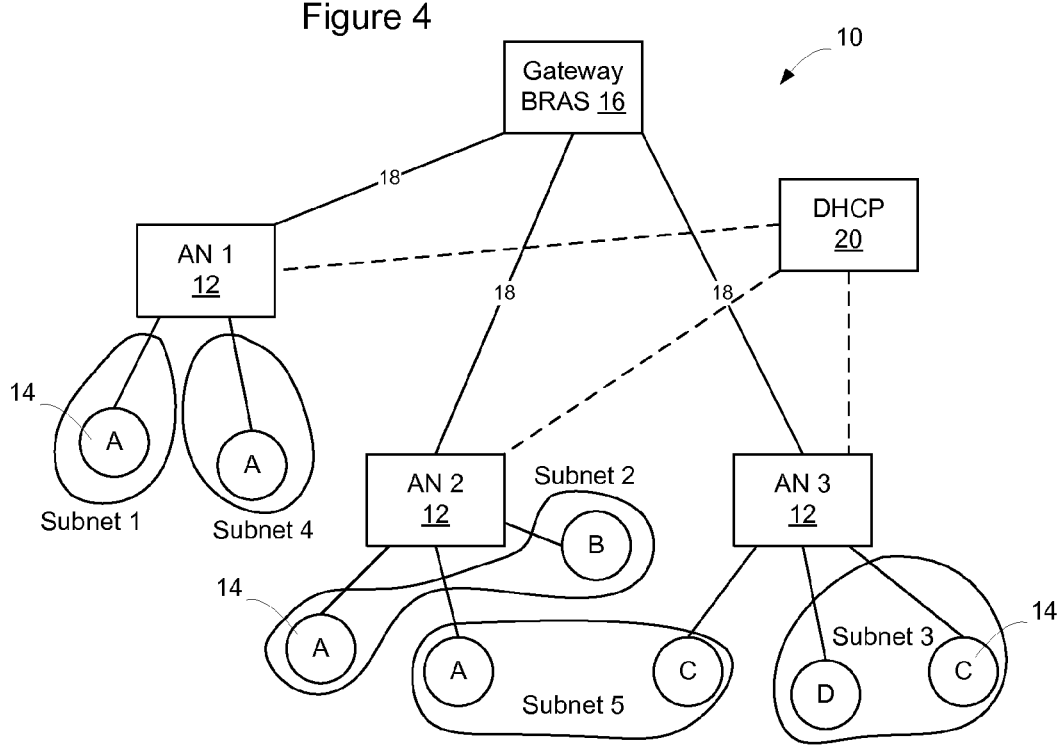

FIGS. 2-4 show several additional examples of how client nodes with duplicate MAC addresses may be assigned to subnets other than the primary subnet associated with their respective access node. In particular, in FIG. 2, all three of the illustrated access nodes include a pair of client nodes having duplicate MAC addresses. Specifically, access node 1 has a pair of client nodes with MAC address=A, access node 2 has a pair of client nodes with MAC address=B, and access node 3 has a pair of client nodes with MAC address=C. Rather than assigning a separate subnet for each of the duplicate pairs, the client devices with duplicate MAC addresses may be assigned IP addresses from a common subnet, so that all of the client nodes with duplicate MAC addresses may be assigned to this duplicate subnet (subnet 4).

FIG. 3 shows another example in which each of the access nodes has a pair of client nodes with duplicate MAC addresses. However, in this instance, access node 2 has three client nodes that all have the same duplicate MAC address. Accordingly, two additional subnets are required to accommodate these three nodes—subnet 4 and subnet 5. The other client nodes with duplicate MAC addresses may be assigned to one of these subnets as shown in FIG. 3.

FIG. 4 shows yet another example of how client nodes with duplicate MAC addresses may occur on the network. In this example, more than one of the access nodes has a pair of client nodes that have the same duplicate MAC address. Specifically, both access node 1 and access node 2 have a pair of client nodes that has MAC address=A. The subnet assigned to each of these access nodes can accommodate one client node with MAC address=A. Similarly, each duplicate address subnet can accommodate at most one client node with MAC address=A. Accordingly, multiple duplicate address subnets (e.g. subnet 4 and subnet 5) should be used to accommodate these multiple client nodes.

To enable traffic on different subnets to be broadcast within the Ethernet domain, a different S-VID or other VLAN identifier may be assigned to each subnet. The BRAS and access nodes may be programmed to associate prefixes from different subnets with these VLAN tags so that traffic addressed to a particular subnet is correctly tagged for transport on the Ethernet network.

In each of FIGS. 1-4, the communication network includes a Dynamic Host Configuration Protocol (DHCP) server 20. DHCP servers are commonly used to assign Internet Protocol addresses on a communication network. According to an embodiment of the invention, the DHCP server maintains a table that tracks the MAC addresses currently with address leases on a given subnet along with the associated facility ID. When a new lease is requested, the DHCP server checks, as part of the IP address assignment process, whether the MAC address associated with an IP address request is a duplicate in the IP subnet currently associated with the facility (e.g. DSL loop). If the DHCP server detects a duplicate MAC address on the current subnet for the access facility it will not assign a MAC address to the client device from that subnet, but rather will assign an IP address to the client node with the duplicate MAC address from a different subnet pool which will have the effect of changing the current subnet associated with that facility. This is made possible by the fact that it is common practice for access nodes to add access facility information, identifying the individual client, to DHCP address requests, so that genuine duplicates (appearing on more than one facility simultaneously) can be distinguished from lack of synchronization of state machines between a client and the DHCP server.

Although implementation of duplicate MAC address checking may be conveniently performed in the DHCP server, the invention is not limited to an embodiment that implements this process in the DHCP server. For example, the access nodes may be provided with a range of S-VIDs and client devices may be assigned to a subnet (S-VID) before obtaining an IP address from the DHCP server. In this embodiment the access nodes may check for duplicate MAC addresses and assign client devices to different subnets as necessary to prevent two client devices with the same MAC address from being assigned to the same subnet. Alternatively numerous other centralized address administration systems exist (e.g. RADIUS based) that could similarly perform the required function.

In one embodiment, the DHCP server preferentially performs subnet assignment for a given request on the basis of both location, and whether the MAC address already exists on the default sub-network. Use of a DHCP server is advantageous since it is a central facility and can therefore coordinate subnets that span multiple access nodes. The DHCP server, in this embodiment, will have a default subnet associated with each access facility from which to assign IP addresses. This allows the DHCP server to assign IP addresses out of the subnet assigned to the access node or client port during the normal course of events, when the MAC address associated with the DHCP request is unique within the access node. The DHCP server will also assign IP addresses out of other subnets for duplicate MAC addresses to prevent more than one instance of a particular MAC address to be assigned to a given subnet.

The access node, in one embodiment, does not keep track of the MAC addresses or know that more than one of its attached client nodes has duplicate MAC addresses. The access node does implement a DHCP relay agent such that it will have opportunity to inspect/modify DHCP transactions as they flow between the client and the server. When the access node receives an offered IP address, the access node will infer the correct VLAN tagging (or IEEE 802.1ah I-SID tagging) to use for the subscriber client node based on the subnet prefix offered by the DHCP server.

Figure 5:
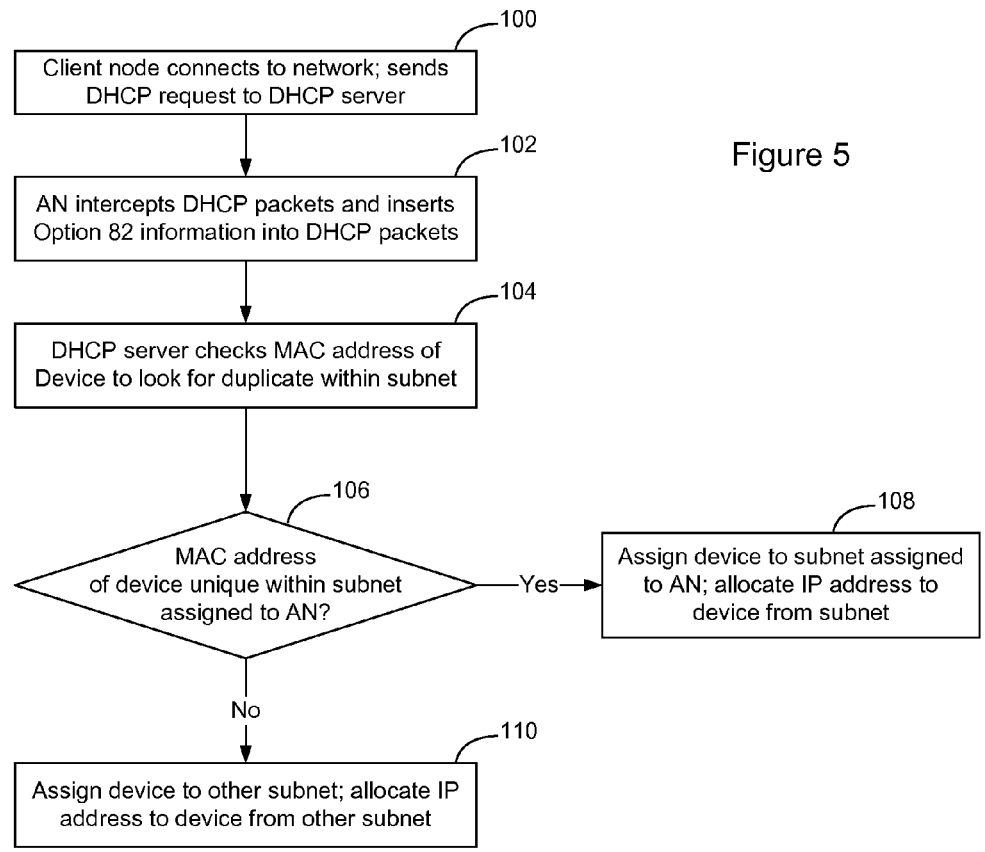
FIG. 5 is a flow diagram of a process that may be used to enable duplicate MAC addresses to be accommodated according to an embodiment of the invention.
Figure 6:
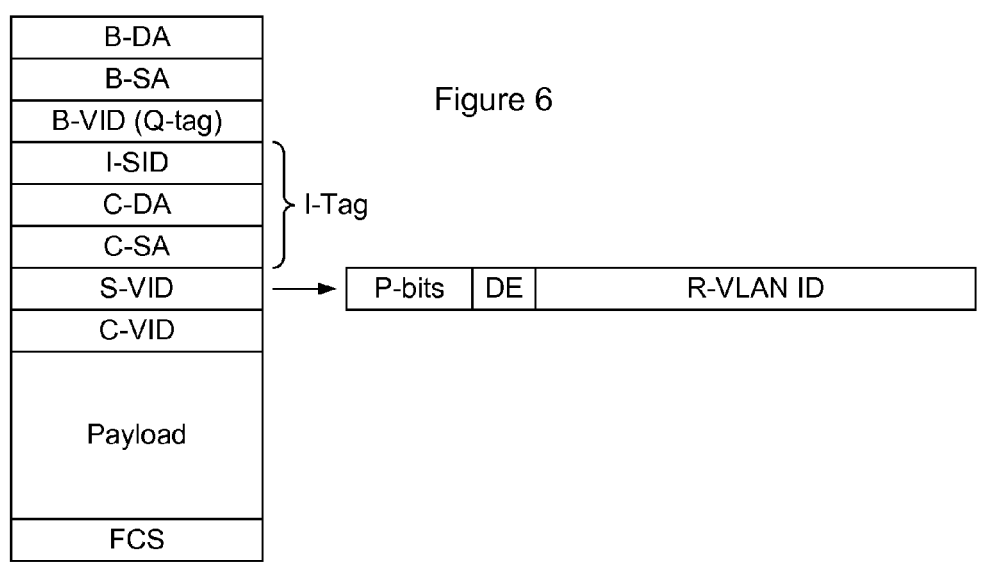
FIG. 6 is a functional block diagram of an Ethernet frame format.

FIG. 5 shows an example process that may be used to enable the DHCP server to accommodate duplicate MAC addresses within the communication network. Specifically, in the process shown in FIG. 5, when a client node connects to the access node it will send a DHCP request to the DHCP server to request assignment of an IP address for use on the network (100). In the preferred embodiment, the access node is required to implement a DHCP relay function, and the access node receives the DHCP request, it will insert DHCP relay agent information (option 82) into the DHCP packets (102) to provide the DHCP server with information about the facility the DHCP client is connected to, typically a port ID or DSL loop identifier. When DHCP Option 82 is enabled at the access node, the access node will insert this information into the DHCP packets as they pass through the switch on their way to the DHCP server.

When the DHCP server receives the DHCP request, it will determine the current subnet associated with the facility and perform a search to look for duplicate MAC address in the set of leases already existing for that subnet (104). Specifically, the DHCP server will look to determine if the MAC address of the client node is unique within a subnet assigned to the access node (106). If the MAC address is unique, the DHCP server will assign the device an IP address lease from pool of unused addresses for the subnet and update its tables accordingly (108). If the MAC address is not unique, the DHCP server will assign the facility to another subnet where that MAC address is unique and allocate an IP address lease to the client node from pool of unused addresses for that subnet.

Figure 7:
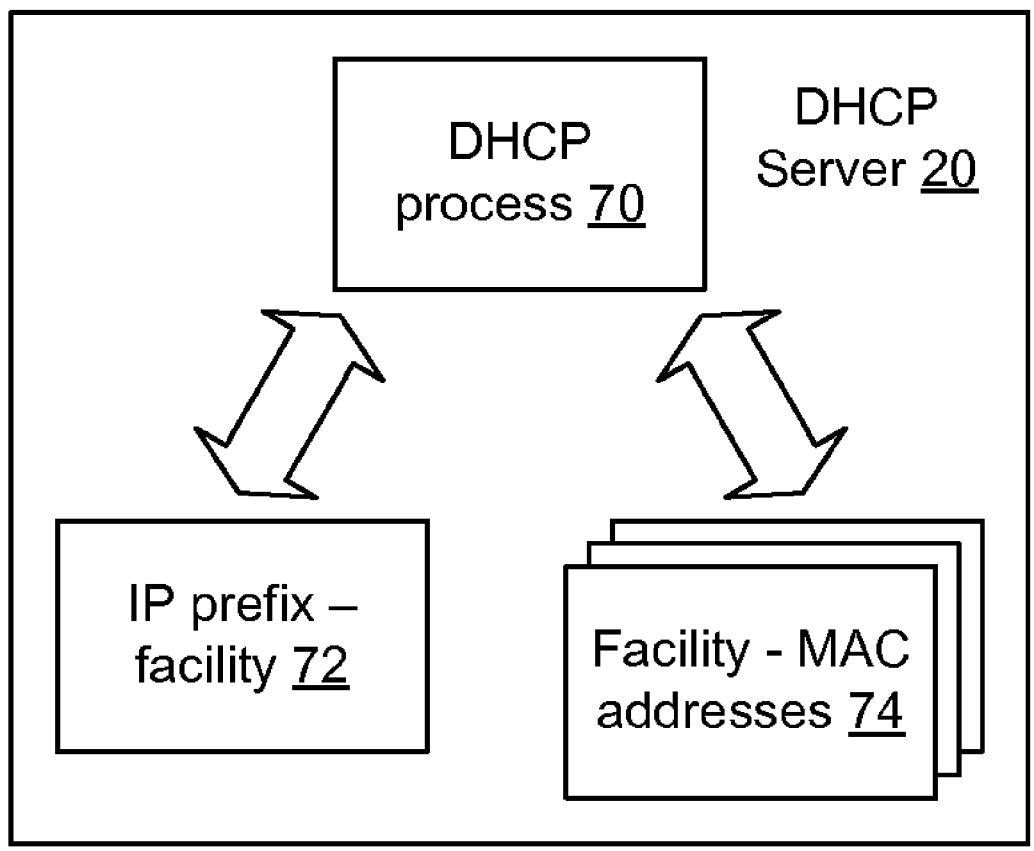
FIG. 7 is a functional block diagram of a DHCP server that may be used to detect duplicate MAC addresses and assign IP addresses from different subnets to accommodate duplicate MAC addresses on a communication network according to an embodiment of the invention.

The DHCP server has a default subnet associated with all facilities on each access node, so that the DHCP server will generally assign IP addresses out of the subnet for the access node when the client nodes attaching to the network do not have duplicate MAC addresses. An example DHCP server is shown in FIG. 7. As shown in FIG. 7, the DHCP server contains one or more instances of a DHCP process 70 that is configured to assign IP addresses on the network. The DHCP server 20 includes a table 72 containing associations between access nodes and assigned subnets. When the DHCP server 20 receives a DHCP request, it will read the Option 82 information provided by the access node in the request to determine the associated subnet from table 72.

As shown in FIG. 7, the DHCP server also has one or more tables 74 that the DHCP server can use to store MAC addresses associated with each access node and subnet. The tables 74 may be implemented as a single table for each subnet, for each access node, or may be implemented such that a given table covers more than one subnet or access node. The DHCP server may also include another table mapping IP prefixes to particular access nodes, optionally in preference order, so that the DHCP server can allocate an IP address out of the correct subnet for the served access nodes. The MAC tables enable the DHCP server to track what MAC addresses are in what subnet. Subnet allocation policy may be originally based on facility ID prior to duplicates being detected, and retaining facility ID/MAC binding helps ensure that there are actually genuine duplicate MAC addresses and that the DHCP server is not simply seeing duplicate DHCP requests from the same access node. The retained facility ID/MAC binding allows duplicate DHCP requests from the same facility to be identified and filtered out. In this embodiment, the DHCP server will use the option 82 information to determine the subnet, and then perform a lookup to determine whether the MAC address of the requesting device is a duplicate of any other MAC address already assigned an IP address from the subnet. Performing a lookup on a per-subnet basis enables the subnet to span across multiple access nodes.

When the DHCP server receives a request from an access node, it will use the tables 74 to determine if the associated MAC address is unique for the current subnet associated with the facility. If the MAC address is unique, the DHCP server will allocate an address from the current subnet for the facility and send the IP address back to the client node. If the MAC address is not unique, the DHCP server will find a subnet where the MAC address is unique and allocate an address from the different subnet where the MAC address is unique. If there is not an available subnet, a means of communicating denial of service will be used. This could be a reserved address which instructed the access node to block the port. An example would be the IPv4 127./8 non-routable prefix.

To enable traffic associated with the MAC address to be mapped to the correct subnet, the access nodes and gateway BRAS are both pre-programmed with a table associating IP prefix with VLAN IDs. In an Ethernet network implemented using IEEE 802.1ad the VLAN IDs may be implemented using S-VIDs. Where the Ethernet network is implemented using IEEE 802.1ah, other VLAN IDs may be used as well, such as the I-SID. Thus, the particular VLAN ID may depend on the particular implementation of the Ethernet network being used to carry traffic between the BRAS and the access nodes.

Assuming the Ethernet network is implemented using IEEE 802.1ad, the DHCP relay function in the access node will read the prefix from the DHCP response and use this to infer the S-VID from the VLAN ID/prefix table. This S-VID will then be associated with the client port so that traffic received from the client can be correctly tagged for transmission on the network.

When downstream traffic received at the access node is tagged with the S-VID or I-SID, the access node can either broadcast the traffic on any port associated with that S-VID/I-SID, or the access node can perform a MAC lookup to determine which output port to use to forward the traffic to the correct client node. Since each client device is represented by a unique MAC within the subnet, tagging each subnet with a different VLAN ID (e.g. S-VID) enables the access node to perform a MAC lookup and unambiguously determine the correct output port, even where more than one client node with the same MAC address has attached to the same access node.

If an access node has not registered interest in the S-VID or I_SID associated with a facility, or does not have a-priori pre-provisioned connectivity, it may have to use registration techniques such as Generic Attribute Registration Protocol (GARP) or Multiple Registration Protocol (MRP) to add the access node to the subnet. MRP is specified in IEEE 802.1ak-2007. Other ways of registering interest in an S-VID may be implemented as well.

When all the leases associated with a given option 82 identified facility (e.g. customer facing port) expire, the subsequent assignment of IP addresses may revert back to the default subnet associated with the facility. This enables subnet fragmentation to be reduced by collecting MAC addresses back to the default subnet assigned to the option 82 facility where there is no longer a duplicate MAC address issue. The goal is not to make correcting duplicates permanent as the equipment deployed by the client may change over time.

If a duplicate MAC appears and requests a lease on a facility that already has a lease on the default subnet initiated by an earlier registration, the DHCP server is required to consider the set of MAC addresses associated with the facility when determining which subnet to assign, the set requiring uniqueness within the assigned subnet. In addition the DHCP server will issue a DHCP-FORCE-RENEW for the existing lease in order to force the current leaseholder to reapply, so that at the time that the new registration transactions are received, the current subnet associated with the facility can be reselected to be one where the set of MAC addresses associated with the facility will be unique.

Although it is desirable to avoid permanent binding of a facility with a duplicate MAC to a non-default subnet, the use of DHCP-FORCE-RENEW represents a service disruption to the leaseholder. The impact of this can be minimized by making the binding "sticky", and associating a facility with a non-default subnet for a programmable period, reset each time duplication with a MAC on the default subnet is detected, after which the association is aged out.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of accommodating client nodes with duplicate media access control (MAC) addresses on a communication network, the method comprising the steps of:
receiving a request for an IP address from a client node associated with a facility, the facility having a default subnet, the request being associated with a MAC address;
determining that the MAC address is a duplicate of another MAC address associated with the default subnet; and
returning to the client node, in response to the request, an IP address associated with a different subnet.

2. The method of claim 1, wherein the default subnet is uniquely mapped to a virtualized LAN segment on the communication network.

3. The method of claim 1, wherein the default subnet is an IP subnet.

4. The method of claim 1, wherein the step of assigning IP addresses is performed by a centralized server.

5. The method of claim 4, wherein the centralized server is a DHCP server.

6. The method of claim 1, wherein the facility is associated with an access node.

7. The method of claim 6, wherein the facility connects to the access node via a physical or virtual port on the access node.

8. The method of claim 6, wherein all MAC addresses associated with a particular facility are allocated IP addresses from a same subnet prefix.

9. The method of claim 8, wherein if a MAC address from the particular facility requests a lease of an IP address and it is determined that the MAC address is required to be assigned to a new subnet different from a current subnet for the particular facility, the method further comprising the steps of revoking all previous IP address leases from the current subnet associated with other MAC addresses on the particular facility to allow future requests from the particular facility to be assigned to the new different subnet.

10. The method of claim 6, wherein the access node supports multiple facilities, and wherein each facility shares a same default subnet such that MAC addresses from each facility supported by the access node are preferentially assigned to the default subnet.

11. The method of claim 10, wherein duplicate MAC addresses from different facilities on the access node will be assigned to different subnets, but wherein duplicate MAC addresses from the same facility will not be assigned to different subnets.

12. The method of claim 1, wherein the communication network is an Ethernet network.

13. A communication network, comprising:
a plurality of access nodes connected to groups of client nodes on facilities and configured to aggregate traffic from the client nodes to a broadband gateway;
a Dynamic Host Configuration Protocol (DHCP) server configured to allocate IP addresses on the communication network, the DHCP server allocating IP addresses from a list of subnets ordered by preference keyed by facility;
wherein the DHCP server maintains a table of MAC addresses associated with each of the subnets and, if the DHCP server detects a request for an IP address from a duplicate MAC address in a subnet currently assigned to a facility, the DHCP server will assign an IP address from a selected different subnet to at least one of the client nodes with the duplicate MAC address and change the subnet currently assigned to the facility to the selected different subnet.

14. The communication network of claim 13, wherein if other MAC addresses have leases on the facility, a DHCP FORCE RENEW is issued to obligate client nodes associated with the other MAC addresses to obtain new leases on the selected different subnet.

15. The communication network of claim 13, wherein, if the subnet currently assigned to the facility has been changed to the selected different subnet, and all leases on the facility have expired, the DHCP server can be configured by a service provider to reset the selected different subnet for that facility to a default subnet.

16. The communication network of claim 13, wherein the access nodes are Ethernet nodes, and wherein the Ethernet nodes assign different Ethernet VLAN identifiers to traffic in different subnets to virtualize the subnets at the Ethernet layer.

17. The communication network of claim 16, wherein each Ethernet node maintains a table mapping IP subnet prefixes to VLAN identifiers to infer the correct VLAN tagging to use for a client node based on the subnet prefix offered by the DHCP server.

18. A computer program product stored on a non-transitory computer readable medium, the computer program product containing data and instructions which, when loaded into one or more processors, cause the one or more processors to perform a method of assigning IP addresses on a communication network, the method comprising the steps of:
receiving a Dynamic Host Configuration Protocol (DHCP) request for IP address assignment, the DHCP request containing Option 82 information identifying an Option 82 facility associated with the DHCP request;
using the Option 82 information from the DHCP request to determine a current subnet associated with the Option 82 facility;
determining whether a MAC address associated with the DHCP request is a duplicate of another MAC address associated with the current subnet;
if the MAC address associated with the DHCP request is not a duplicate of another MAC address associated with the current subnet, assigning an IP address from a current subnet prefix associated with the current subnet; and
if the MAC address associated with the DHCP request is a duplicate of another MAC address associated with the current subnet for the Option 82 facility, assigning an IP address from another subnet prefix other than the current subnet prefix.

19. A method for assigning an IP address, comprising:
receiving, by a server, a request for an IP address from a first client device coupled to an access node, the access node having a primary subnet associated therewith, the request including a first media access control (MAC) address associated with the first client device;
making a determination, by the server, that a second MAC address associated with a second client device that is assigned to the primary subnet is identical to the first MAC address;
in response to the request:
establishing a secondary subnet to be associated with the access node;
generating an IP address in the secondary subnet; and
assigning the IP address to the first client device.

* * * * *